Figure 1:
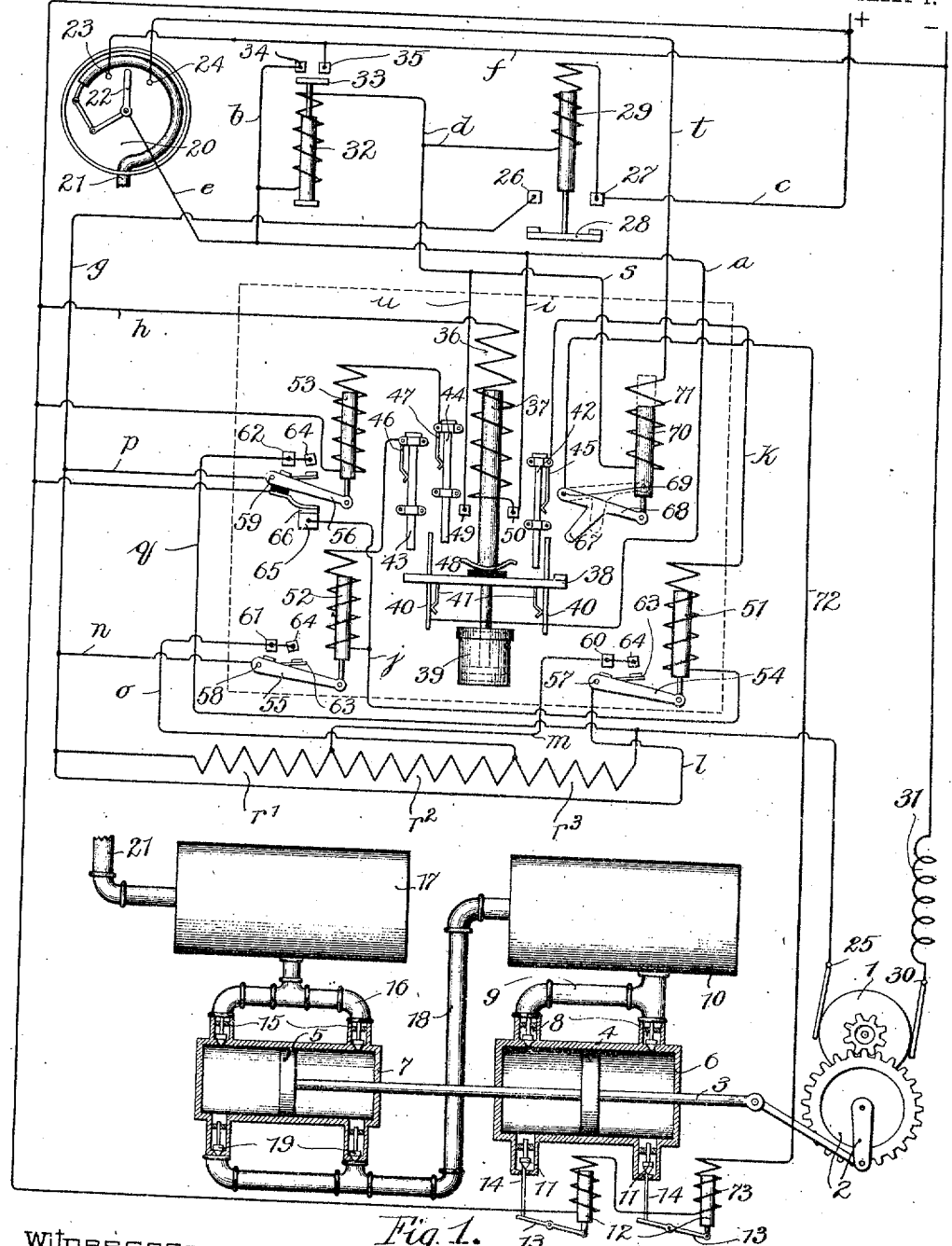

No. 858,471. PATENTED JULY 2, 1907.
W. J. RICHARDS.
CONTROLLING APPARATUS FOR PRESSURE SYSTEMS.
APPLICATION FILED JAN. 3, 1905.

2 SHEETS—SHEET 1.

Witnesses:
Leonard W. Novander.
Charles J. Schmidt.

Inventor
Walter J. Richards
By Charles A. Brown
Attorney

UNITED STATES PATENT OFFICE.

WALTER J. RICHARDS, OF MILWAUKEE, WISCONSIN.

CONTROLLING APPARATUS FOR PRESSURE SYSTEMS.

No. 858,471.  Specification of Letters Patent.  Patented July 2, 1907.

Application filed January 3, 1905. Serial No. 239,305.

*To all whom it may concern:*

Be it known that I, WALTER J. RICHARDS, a citizen of the United States, residing at Milwaukee, in the county of Milwaukee and State of Wisconsin, have invented a certain new and useful Improvement in Controlling Apparatus for Pressure Systems, of which the following is a full, clear, concise, and exact description, reference being had to the accompanying drawings, forming a part of this specification.

My invention relates to motor driven fluid pumps, or compressors, and its object is to provide improved means for starting and stopping such pumps or compressors with as gradual variation in the current flow as possible.

My invention is particularly useful where the motor driving the compressor, or pump, is fed from a dynamo of small capacity, and which is at the same time used for supplying energy for lamps or other translating devices.

The driving motors when properly wound may be started by throwing full voltage thereon, but when this is done the initial current flow would be very great, and as much as two or three times the normal current flow, and when the motor is connected with a small capacity dynamo the lights and other translating devices of the circuit are momentarily disturbed and unbalanced. Again the sudden opening of the motor circuit at full load would also cause a disturbance of the line, and at the same time this sudden connection with and from circuit places a very severe strain upon both the driving motor and the pump, or compressor apparatus.

In my invention I provide means whereby the current is placed gradually upon the motor, and this is done by starting the compressor in an unloaded state, and by automatically and gradually disconnecting a resistance from the motor circuit, which resistance is normally all included in circuit with the motor. After all the resistance is removed from the motor circuit the unloading devices are rendered inoperative, so that the compressor, or pump, may become active to supply compressed fluid to the system. After the pressure of the system has reached a predetermined maximum the unloading devices are caused to become operative a given interval of time before the opening of the circuit to the motor. Part of the motor load is thus reduced and consequently the current flow is gradually reduced and after the interval the motor circuit is opened. This unloading of the compressor or pump before the final opening of the motor circuit forms one of the most important features of my invention.

My invention is applicable to both single and compound compressor systems. In the single compressor system the unloading devices may consist of means for lifting the suction valves out of their zone of action so that the compressor becomes inoperative. I shall describe my invention, however, in connection with compound systems and the same unloading mechanism may be employed for both the high and low pressure cylinders, but I prefer to apply this unloading mechanism to only the suction valves of the low pressure cylinder and to allow the suction valves of the high pressure cylinder to be at all times in operative condition.

Broadly speaking the invention consists in at first connecting the motor in circuit with all the resistance effective and then by means of electromagnetic switching mechanism, which will be described later, to gradually render this resistance ineffective. After all the resistance is thus removed from circuit the unloading mechanism is rendered inoperative to allow the compressor or pump to become active and the full load will be upon the motor. As the predetermined maximum pressure in the system is reached switching mechanism is set in operation to first render the unloading mechanism operative, whereby the high pressure cylinder becomes ineffective and its resistance removed from the motor.

After an interval of time the motor circuit will be opened, but during this interval the high pressure cylinder will be actuated sufficiently to reduce the pressure in the intermediary cylinder or intercooler to atmospheric pressure. In other words, this interval is of sufficient length to allow the motor to actuate the high pressure cylinder to pump air from the intercooler until the pressure in the intercooler is atmospheric. Thus when minimum pressure in the system is reached and the motor again connected in circuit very little resistance or load will be offered by the high pressure cylinder, owing to this low or atmospheric pressure in the intercooler from which the pressure cylinder is supplied. As a further precaution to prevent undue load upon the motor at starting I may provide a vent for the intercooler, which is controlled to allow the escape of the air from the intercooler at the time when the high pressure cylinder is rendered inactive.

Figure 2:
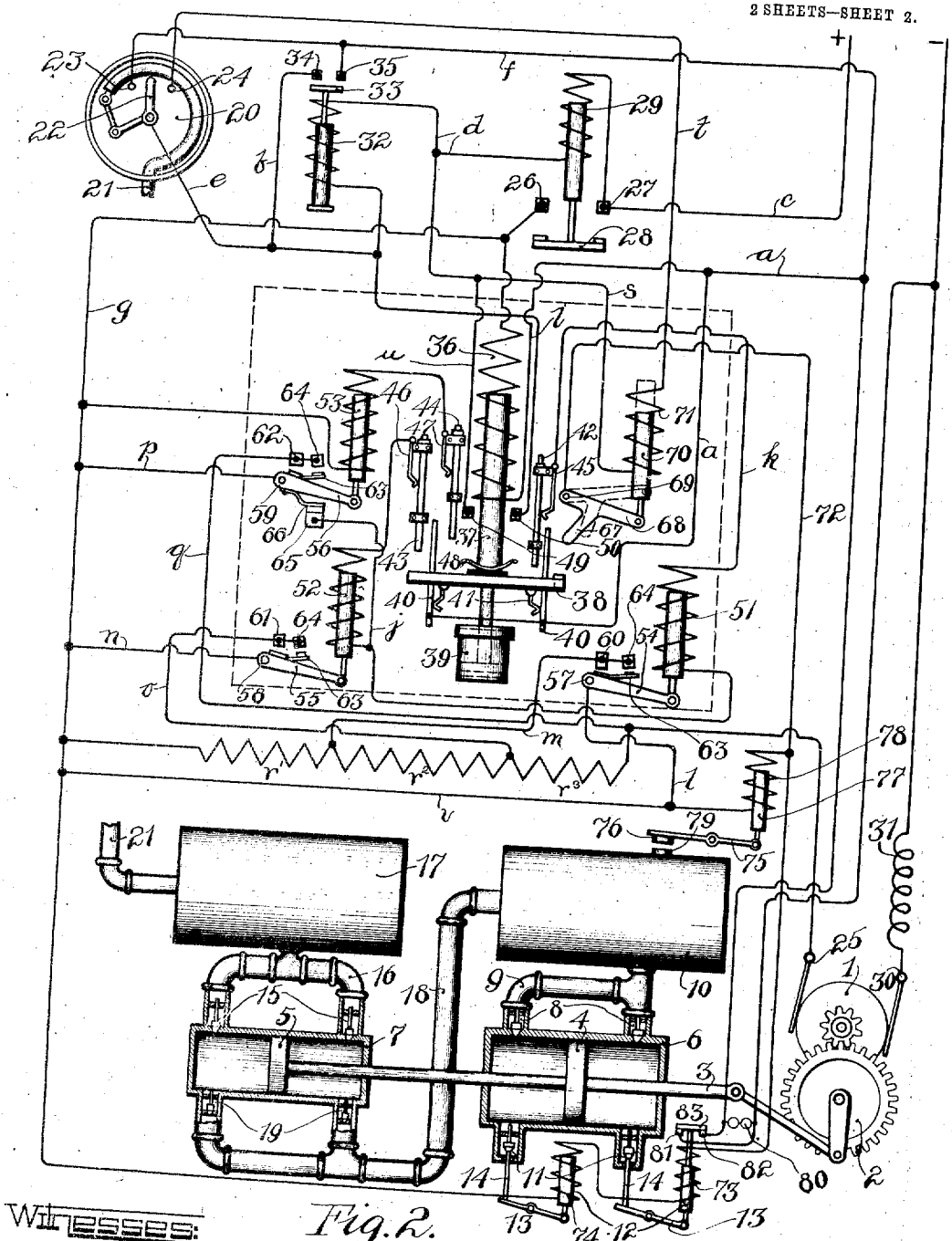

I shall describe my invention more in detail with reference to the accompanying drawings in which Figure 1 shows one arrangement of circuits and apparatus, and Fig. 2 another arrangement which may be used.

In Fig. 1 the motor 1 is suitably connected through mechanism 2 with the piston rod 3, carrying the pistons 4 and 5 adapted to travel respectively in the low pressure and high pressure cylinders 6 and 7. The low pressure cylinder is provided with discharge valves 8, which control a circuit through the passage 9 leading to the intermediary storage tank or intercooler 10. The suction valves 11 of this cylinder are normally held from their seats, due to the weight of the solenoid cores 12 acting on levers 13, which engage the ends of the valve stems 14. The high pressure cylinder 7 is provided with discharge valves 15 controlling the passage 16 leading to the main supply tank 17 which is connected with the pressure system. This high pressure cylinder draws its supply of fluid from the intercooler 10 through the pipe 18 and the passage of the fluid into the high pressure cylinder is controlled by the suction valves 19, which at all times are operative.

A switch which may be a Bourdon gage as shown is connected with the main supply tank 17 through pipe 21 and responds to the variations of pressure to actuate a switch arm 22 to travel between a minimum contact 23 and a maximum contact 24. The resistance for the motor consists of section $r^1$, $r^2$, and $r^3$, which may be connected serially together as shown, one end of the series being connected with the terminal 25 of the motor, while the other end of the series is connected with the contact 26, which contact is connected with contact 27 through the arm 28 upon energization of the coil 29. The contact 27 is connected with the positive limb of the supply circuit, and the terminal 30 of the motor is connected with the negative limb of the supply circuit through the field winding 31. A second relay 32 serves to connect an arm 33 with contacts 34 and 35, principally for the purpose of connecting various other electromagnetic mechanism with the negative supply main.

As a means for gradually rendering the resistance ineffective I employ a main relay 36 whose core 37 is connected with a contact arm or disk 38, and which core is also connected with dash-pot mechanism 39. This contact arm or disk 38 is always in contact with stationary rods or contacts 40, which to offer better electrical connection, may be engaged by wiper contacts 41 connected with the disk. Arranged above this disk are sliding contact rods 42, 43 and 44, the lower end of the rod 42 being nearest the disk, the rod 44 being farthest from the disk, while the rod 43 assumes an intermediary position, and thus as the disk is raised upon energization of the relay 36 the rods will be engaged in the order 42, 43 and 44. The contacts 42, 43 and 44 are engaged respectively by contact springs 45, 46 and 47, which always engage these contact rods as they are moved upwardly by the disk 38. A spring contact 48 is secured to the upper part of the disk but insulated therefrom, and when the core reaches its uppermost position this spring will connect together the contacts 49 and 50.

Auxiliary solenoids have one terminal of their windings 51 52 and 53 respectively connected with the movable contacts 45, 46 and 47, the other terminal of the windings being adapted for connection with the positive supply main, and as the contact arm 38 is raised upon energization of the core 36 the windings 51, 52 and 53 will be connected in circuit in the order named, the stationary contact rods 40 being adapted for connection with the negative supply main through the conductors $a$ and $b$ and through the contacts 34 and 35 of the relay 32.

The cores of the solenoid windings 51, 52 and 53 are respectively connected with one end of levers 54, 55 and 56, pivoted respectively at 57, 58 and 59, and each of these levers is adapted for connection with the positive main. Contacts 60, 61 and 62 are provided for levers 54, 55 and 56, the contact 60 being connected with the inner end of the resistance section $r^1$, the contact 61 being connected with the inner end of the resistance section $r^2$, while the contact 62 is connected directly with the terminal 25 of the motor.

Upon energization, therefore, of these auxiliary solenoid mechanisms the respective resistance sections will be short circuited from the motor circuit. To guard against welding of the contacts due to arcing, auxiliary contacts are employed consisting of the arms 63 and the carbon contacts 64 which are mounted in parallel to the main contacts of each solenoid. These contacts are adjusted to engage in advance of the main contacts and to break after the main contacts thereby causing any arcing to occur on the carbon.

It will be noticed that windings 51 and 52 are fed through a contact 65 and a contact 66, the contact 66 being carried by the arm 56, but insulated therefrom when the arrangement shown in Fig. 1 is employed. As the solenoid 53 is energized to directly connect the motor in circuit it becomes unnecessary to maintain activity of the solenoids 51 and 52, and these are accordingly removed from circuit upon disengagement of the contacts 65 and 66 as the arm 56 is raised upon energization of the solenoid 53.

When the contact arm 38 of the relay 36 has been gradually raised a sufficient distance to connect the auxiliary relays in circuit the upward advance of the arm will be stopped upon engagement thereof with the tongue 67 extending from the lever 68 which is pivoted at 69 and connected at its free end with the core 70 of the solenoid 71. This tongue 67 is connected with the positive supply main through the conductor 72, and serially through the energizing windings 73 and 74 of the cores 12 of the unloading mechanism, and as the arm 38 is adapted for connection with the negative supply main, circuit will be closed through the windings 73 and 74 upon engagement of the arm 38 with the tongue 67 and the cores 12 will be raised and the suction valves 11 of the low pressure cylinder rendered operative, and thus the entire pumping mechanism becomes active. This activity of the pumps continues until a predetermined maximum pressure in the system is reached, whereupon the gage hand 22 will connect the winding 71 in circuit, and the core 70 will be raised to remove the tongue 67 from the path of the arm 38 and to break connection therewith. The circuit through the windings 73 and 74 is thereupon broken, and the low pressure cylinder again rendered inoperative and its load removed from the motor. The arm 38 also being released is raised further until the spring contact 38 engages the contacts 49 and 50, whereupon a short circuit is closed about the relay 32 which becomes de-energized to disconnect the contacts 34 and 35, which will cause disconnection of the coil 29 and the auxiliary solenoid mechanisms from the negative main, and the mechanisms to become inert.

I shall now trace the various circuits through the different apparatus. Upon a predetermined value for the minimum pressure in the system the arm 22 will engage the minimum contact 23; current now flows from the positive main through the conductor $c$ to contact 27 through the winding of the relay 29, through conductor $d$, through the coil 32, through conductor $e$, through switch arm 22, contact 23 and through conductor $f$ to the negative main. The coil 29 will then carry the arm 28 into engagement with contacts 26 and 27, while the relay 32 will move its arm 33 to the contacts 34 and 35. The connection of the contacts 34 and 35 closes a short circuit about the gage hand 22, and thus protects the gage contacts from injurious effects of arcing. Current now flows from the positive main through conductor $c$, through contact 27, arm 28, contact 26, conductor $g$ and serially through the resistance sections $r^1$, $r^2$ and $r^3$ to the terminal 25 of the motor, and as the other terminal of the motor is connected with the negative main the motor will start. At the same time current flows from the positive main through conductor $h$, through the winding of relay 36 to the contact 50, through conductor $i$, conductor $a$, conductor $b$ and through contacts 34 and 35 and arm 33, and through conductor $f$ to the negative main, thus causing energization of the main relay, and the arm 38 is raised gradually, owing to the connection therewith of the dash-pot mechanism 39.

When the arm 38 engages the movable contact 42 circuit will flow as follows: from the positive main through the contacts 66 and 65, conductor $j$ through winding 51, conductor $k$, immovable contact 45, movable contact 42, arm 38, conductor $a$, conductor $b$ and through contacts 34 and 35 to the negative main. Solenoid 51 thereupon becomes energized to connect its arm 54 with the contacts 64 and 60, and current will then flow from the positive main through the conductors $v$ and $l$, arm 54, contact 60, conductor $m$, through resistance $r^2$, $r^3$ and through the motor to the negative main the resistance section $r^1$ having been shunted from circuit. When the contact arm 38 reaches the movable contact 43 the following circuit will be established: from the positive main through contacts 65 and 66, conductor $j$, solenoid winding 52, contacts 46 and 43 and to contact arm 38 which is connected with the negative main. The solenoid 52 is thereupon energized to close the following circuit: from the conductor $g$, connected with the positive main through the contacts 26 and 27, through conductor $n$, arm 55, contact 61, conductor $o$, through a resistance section $r^3$, and through the motor to the negative main, both resistance sections $r^1$ and $r^2$ being short circuited from the motor circuit. When the arm reaches the contact arm 44 current will flow from the positive main to the solenoid 53, contacts 47 and 44 and through contact arm 38 to the negative main. The resulting energization of solenoid 53 causes current to flow from the conductor $g$, connected with the positive main, through conductor $p$, arm 56, contact 62, conductor $q$ and directly to the motor terminal 25, and through the motor to the negative main, the resistance being all shunted from circuit. Upon energization also of the solenoid 53 the contact 66 is raised from contact 65 and the connection of the solenoids 51 and 52 with the positive main is broken; current flow through these solenoids having become unnecessary upon the complete removal from circuit of the resistance upon energization of the solenoid 53. The motor is now directly connected with the supply circuit having gradually acquired full speed without undue and harmful current drain on the main supply circuit. As the arm 38 is raised still further and into contact with the tongue 67 the following circuit will be established: from the positive main through the windings 73 and 74 to the conductor 72, through contact 67 and contact arm 38 to the negative main. This causes energization of the windings 73 and 74 to allow the suction valves of the low pressure cylinder to become operative and the entire pressure system now becomes effective, and this effective operation continues until a certain predetermined maximum pressure is obtained in the system.

The pivot center 69 and the contact end of tongue 67 are in the same vertical line when the relay 71 is inert, and the upward movement of the arm 38 upon engagement with the tongue 67 will be checked. As the predetermined value of the maximum pressure is now obtained after a period of effective operation of the system the arm 22 of the gage will engage the maximum contact 24 and the solenoid 71 will be connected in circuit in parallel with the relay 32, the current flow, however, being sufficient to maintain energization of both these relays. The circuit through the solenoid 71 is as follows: from the positive main through the coil 29, conductor $s$, solenoid 71, conductor $t$, contact 24, arm 22, conductors $e$ and $b$ and through contact 34 and 35 to the negative main. The core 70 will therefore, be raised to remove the tongue 67 from engagement with the arm 38. This causes opening of the circuit containing the unloading electromagnets 73 and 74, the suction valves 11 being again rendered inoperative, and the load of the low pressure cylinder is, therefore, removed from the motor and the result will be a diminished current flow through the motor circuit. The arm 38 thus released may continue its upward travel until the spring contact 48 engages the contacts 49 and 50, whereupon the relays 32 and 71 will be short circuited through the following path: from the positive main through the coil 29, conductor $s$, conductor $u$, contact 49, spring switch 48, contact 50, conductor $i$, conductor $a$, conductor $b$ and through contacts 34 and 35 and the negative main. As this closes a short circuit about the relay 32 this relay becomes deënergized and the arm 33 opens the contacts 34 and 35, and as the connection of the main relay and auxiliary relays depend for their connection with the negative main upon the closure of contacts 34 and 35 they will all become deënergized upon opening of these contacts, and as coil 29 also depends for its connection with the negative main upon these contacts 34 and 35 it also will become deënergized to open connections between contacts 26 and 27, and the current flow to the motor will, therefore, be interrupted. It will be seen that although the load due to the low pressure cylinder is removed from the motor upon energization of solenoid 71, the high pressure cylinder load is still upon the motor during the interval of time between the energization of this relay 71 and the instant when the arm 38 has gradually been raised sufficiently to engage the switch spring 48 with the contacts 49 and 50 to short circuit the relay 32 and to open all the supply conductors. As the suction valves of the low pressure cylinder, however, are raised from their seats, this cylinder can no longer supply fluid to the intercooler 10, and consequently the load due to the high pressure cylinder is reduced as the pressure in the intercooler is decreased; this pressure finally becoming atmospheric.

The load offered the motor by the high presure cylinder when its intake fluid is at atmospheric pressure is very little, and consequently the current through the motor can be interrupted without trouble. The retarding mechanism of the main relay 36 is so adjusted that the interval between release of the arm 38 and short circuiting of the contacts 49 and 50 is sufficient to allow actuation of the high pressure cylinder by the motor until the pressure of the air in the intercooler is reduced to atmospheric pressure, and when the circuit is finally broken the supply circuit to which the motor is connected will not be suddenly unbalanced. Thus the motor is gradually disconnected from circuit, the load of the low pressure cylinder being first removed to cause a decrease in current, and the high pressure cylinder load being then gradually reduced to a small value, and this feature of gradual removal of the compressor load before opening of the motor circuit I consider as new, and it forms one of the most important features of my invention. When the pressure of the system again reaches the minimum value the motor upon starting will meet only the small load of the high pressure cylinder. To further insure the prevention of supply pressure on the high pressure cylinder due to the fact that the intercooler has not been sufficiently exhausted at the previous action of the compressor system, I may provide venting means as shown in Fig. 2 for the intercooler which is actuated simultaneously with the unloading relays to allow escape of the air from the intercooler. This venting means consists of a lever 75 provided at its one end with a lid 76, and connected with the other end with the core 77 of the solenoid 78, and this lid upon energization of the solenoid 78 engages over the top of the vent 79 to close the intercooler and to render it operative. The solenoid 78 may be connected in branch of the relays 73 and 74 as shown; the circuit being from the positive main through the conductor $v$ through the solenoid 78, through the conductor 72 and through the tongue 67 and arm 38 to the negative main, and thus upon actuation of the relays 73 and 74 to render the low pressure cylinder effective, the solenoid 78 is simultaneously actuated to cause closure of the vent 79. Upon breaking of the circuit, however, at contact 67 and arm 38 the vent is opened and the air in the intercooler reduced to atmospheric pressure. The load, due to the high pressure cylinder, is therefore immediately, instead of gradually, reduced, and the automatic vent serves the additional advantage of allowing escape to the atmosphere of any air or fluid which might escape back from the air pressure system through the valves of the high pressure cylinder, and this would at all times prevent the placing of a load upon the motor at the time of starting, due to any resistance pressure in the high pressure cylinder.

In Fig. 2 I show a slightly modified arrangement of circuits and here the main relay 36 and the auxiliary solenoids 51, 52 and 53 are connected with the contact 26 and their connection with the positive main thus directly controlled by the coil 29, while they are adapted to be directly connected with the negative main. In Fig. 1, these relays are connected directly with the positive main and are adapted for connection with the negative main through contacts of relays 32. The relay 36 is connected with the positive main through contact 26, arm 28, contact 27 at conductor $c$ and is connected with the negative main through the conductors $i$ and $a$. The solenoids 51 and 52 connect with the positive main through conductor $j$, contacts 65 and 66, arm 56 and conductor $g$ and through contacts 26 and 27, the solenoid 53 being also connected with the positive main through the conductor $g$ and contacts 26 and 27. The other terminals of these relays connect through the respective movable contacts 42, 43 and 44 with the contact arm 38 and through the conductor $a$ with the negative main. In this circuit, therefore, the coil 29 directly controls both the motor circuit and the various feed circuits to the solenoids, while in Fig. 1, the coil 29 directly controls only the motor circuit, while the relay 32 controls the various circuits to the solenoids. The operations of both arrangements are otherwise, however, exactly alike. I may also provide means for reducing the current flow through the electromagnetic mechanisms after they have performed their function of pulling from a distance and have nothing more to do but to retain their load. After such actuation of the electromagnetic mechanisms less current is necessary to hold them in position, and I therefore provide resistance which becomes effective to reduce the current through the mechanisms. This resistance may be in lamps 80 connected with contacts 81, 82 associated with the arm 83 connected with the core 12 of one of the unloading coils, for instance 73. The circuit to the negative main at first leads from the electromagnetic mechanisms through the conductor $x$, contact 82, arm 83, contact 81 and through conductor $y$ to the negative main. As the coil 73, becomes energized, this circuit will include the lamps 80 and the current thus reduced.

The system of control herein described provides for a safe and gradual current flow to the compressor system, and is, therefore, of great value where the pressure system is connected with a supply circuit and at the same time used for supplying current to lights and other translating devices where the dynamo feeding the system is of small capacity and where sudden variation of load would seriously unbalance the circuit. I do not wish, however, to be limited to an exact arrangement of the apparatus and circuits as shown, as many modifications may be made without departing from the scope or spirit of the invention. Instead of only one high pressure and one low pressure cylinder as shown, and one intercooler, several of these may be employed and other additions and changes will suggest themselves to those skilled in the art.

I claim as new, and desire to secure by Letters Patent:

1. The combination with a motor, of a circuit therefor, a compressor driven thereby for supplying a pressure system, electromagnetically controlled unloading means normally effective to unload the compressor, means for gradually starting the motor, means for causing actuation of the unloading means only after the motor has reached normal speed whereby said compressor becomes effective, additional means for again rendering the unloading means effective whereby the compressor becomes ineffective and its load removed from the motor, and electromagnetic means adapted to operate after an interval to disconnect the motor from circuit.

2. The combination with a motor, of a circuit therefor, a compressor driven thereby for supplying a pressure system, electromagnetically controlled unloading means normally effective to unload the compressor, starting means for said motor, means controlled by the pressure in the system for causing actuation of the unloading means after said motor has reached normal speed whereby said compressor is rendered effective, additional means for again rendering said unloading means effective whereby the pressure load is removed from the motor, and automatic means for disconnecting the motor from circuit after said unloading means has been rendered effective.

3. The combination with an electric motor, of a compressor driven thereby for supplying a pressure system, a resistance for the motor circuit, a main relay, a switch automatically controlled by the pressure in the system and adapted upon actuation to connect said main relay with a supply circuit, actuation of said main relay causing said motor to be initially connected with the supply circuit with all the resistance effective, a plurality of electromagnetic switching mechanisms connected with said resistance, a master electromagnetic switching mechanism adapted to be connected with the supply circuit upon actuation of said automatic switch, and means upon actuation of said master switch for causing the switching mechanism associated therewith to be gradually and successively connected with the supply circuit whereby said resistance is gradually rendered ineffective and the motor connected directly with the supply circuit.

4. The combination with a motor, of a resistance for the motor circuit, a main relay adapted for connection with a supply circuit, actuation of said main relay causing said motor to be initially connected with the supply circuit with all the resistance effective, a plurality of solenoids, switch mechanisms actuated by said solenoids and connected with said resistance, a master relay, and means for causing said master relay to be actuated to gradually and successively render said solenoids active whereby said resistance is gradually rendered ineffective and the motor connected directly with the supply circuit.

5. The combination with a motor, of a resistance for the motor circuit, a main relay adapted when connected with a supply circuit to connect said motor initially with the supply circuit through all the resistance, a master relay adapted to be connected with the supply circuit, means for causing slow actuation of said master relay upon energization thereof, a contact arm for said main relay, a plurality of subrelays, switching mechanism actuated by said subrelays and connected with said resistance, contacts for said subrelays associated with the contact arm of said master relay, and means operative upon energization of said master relay for causing said contact arm to successively engage the subrelays and contacts whereby said subrelays are successively actuated and their switching mechanisms caused to gradually exclude the resistance from the motor circuit.

6. The combination with a motor, of a resistance for the motor circuit, a main relay for initially connecting said motor with a supply circuit through all said resistance, an automatic switch adapted upon actuation to connect said main relay with the supply circuit, a master relay connected with the supply circuit upon actuation of said automatic switch, switching mechanism controlled by said master relay, a plurality of sub-relays connected with said master relay switching mechanism, switching mechanism controlled by said sub-relays and connected with said resistance, and means operative upon actuation of said master relay for causing gradual and successive actuation of its switching mechanism to successively and gradually connect said sub-relays in circuit to render the switching mechanisms of said sub-relays active, whereby said resistance is gradually excluded from the motor circuit and the motor connected directly with the supply circuit.

7. The combination with a motor, of a compressor driven thereby for supplying a pressure system, electromagnetically controlled means associated with the suction valves of the compressor for normally rendering said compressor ineffective, a main relay, a switch controlled by the pressure in the system for connecting said main relay with a supply circuit, a master relay adapted upon actuation of said main relay to be connected with the supply circuit, a circuit controlled by the master relay and including the electromagnetic means associated with the suction valves, means upon actuation of said master relay for causing closure of said circuit to cause actuation of the electromagnetically controlled means to render the suction valves and the compressor effective, means operative upon another actuation of said switch for opening said circuit whereby the suction valves and compressor again become ineffective, and means associated with said master relay adapted to operate after an interval to cause disconnection of said main relay from the supply circuit whereby said motor circuit is opened.

8. The combination with a motor, of a compressor driven thereby for supplying a pressure system, electromagnetically controlled mechanism associated with the suction valves of the compressor for normally causing said valves to be inoperative and adapted upon current flow therethrough to allow the valves to become operative, a switch automatically controlled by the pressure in the system, a main relay adapted to be connected with the supply circuit through said switch upon minimum pressure being reached in the system, actuation of said main relay causing said motor to be connected with the supply circuit, a slow acting master relay mechanism adapted to cause closure of a circuit through the electromagnetic valve controlling mechanism after the motor has started, whereby the motor is rendered effective to supply pressure to the system, means for causing said automatic switch to open the circuit through said electromagnetic valve controlling mechanism when the pressure in the system reaches a maximum value whereby the compressor becomes ineffective, and means whereby said slow acting relay mechanism causes said main relay to be disconnected from the supply circuit after an interval, whereby the circuit through said motor is interrupted.

9. The combination with a motor, of a circuit therefor, a compressor driven thereby for supplying a pressure system, normally effective unloading means for said compressor, means for causing the unloading means to become ineffective after the motor has been started, additional means for causing the unloading means to again become effective when the pressure in the system becomes maximum, and means operative after an interval to disconnect the motor from circuit.

10. The combination with a motor, of a circuit therefor, a compressor driven thereby for supplying a pressure system, normally effective unloading means for the compressor, means for causing the unloading means to become ineffective when the motor has been started, additional means for causing the unloading means to again become effective after the pressure in the system becomes maximum, and electromagnetic means adapted to operate after an interval to disconnect the motor from circuit.

11. The combination with a motor, of a circuit therefor, a compressor driven thereby for supplying a pressure system, normally effective unloading means for the compressor, electrical means controlled by the pressure of the system for causing the unloading means to become ineffective after the motor has started whereby the compressor becomes effective to supply pressure to the system, additional means for causing the unloading means to again become effective after the pressure in the system reaches a maximum value, and automatic means for disconnecting the motor from circuit after said unloading means has been rendered effective.

12. The combination with a motor, of compressor mechanism driven thereby for supplying the pressure system, a high pressure and a low pressure cylinder for said compressor mechanism, electromagnetically controlled unloading means for the low pressure cylinder normally disposed to render the cylinder ineffective, means for causing actuation of said unloading means to render the cylinder effective after the motor has been started, additional means for again rendering the unloading means effective whereby the load of the low pressure cylinder is removed from the motor, and automatic means for disconnecting said motor from circuit after actuation of said unloading means.

13. The combination with a motor, of compressor mechanism driven thereby for supplying a pressure system, a low pressure and a high pressure cylinder for said compressor mechanism, unloading mechanism for said compressor mechanism for removing the low pressure cylinder load from the motor thereby to gradually reduce the high pressure cylinder load of the motor, and automatic means for subsequently disconnecting the motor from circuit.

14. The combination with an electric motor, of compression mechanism driven thereby for supplying the pressure system, a high pressure and a low pressure cylinder for said compression mechanism, an intermediate tank into which the low pressure cylinder discharges and from which the high pressure cylinder receives, normally effective unloading means for the low pressure cylinder, means for rendering the unloading mechanism ineffective after the motor has been started whereby the low pressure cylinder becomes effective to supply pressure to the system, additional means for causing the unloading means to again become effective whereby the load of the low pressure cylinder is removed from the motor and the load due to the high pressure cylinder then gradually reduced, and automatic means for subsequently disconnecting the motor from the circuit.

15. The combination with a motor, of compression mechanism driven thereby for supplying a pressure system, a high pressure and a low pressure cylinder for said mechanism, an intermediary tank into which the low pressure cylinder discharges and from which the high pressure cylinder receives, electromagnetically controlled unloading means for the low pressure cylinder normally disposed to render said cylinder ineffective, means for causing actuation of the unloading means when the pressure reaches minimum value whereby the low pressure cylinder becomes effective to supply pressure to the system, additional means for causing said unloading means to again become effective after an interval of operation of said motor whereby said low pressure cylinder becomes ineffective, said motor continuing its operation to cause the high pressure cylinder to exhaust the intermediary tank to reduce the pressure therein, and electromagnetic means operable thereafter for automatically disconnecting said motor from circuit.

16. The combination with a motor, of compression mechanism driven thereby for supplying a pressure system, a low pressure and a high pressure cylinder for said compression mechanism, an intermediary tank into which the low pressure cylinder discharges and from which the high pressure cylinder receives, unloading means for said low pressure cylinder for normally rendering said cylinder ineffective, a resistance for the motor circuit, a main relay controlled by the pressure in the system to initially connect the motor with a supply circuit with all the resistance effective, slow acting relay mechanism adapted to gradually remove said resistance from the motor circuit and to connect the motor directly with the supply circuit, means controlled by said slow acting relay mechanism for causing said unloading means to become ineffective after said motor has been connected directly with the supply circuit whereby said low pressure cylinder becomes effective, additional means for again causing the unloading means to become effective after the pressure reaches a maximum value, and further means also controlled by said slow acting relay mechanism for disconnecting said motor from the supply circuit an interval after said unloading means has again been rendered effective, said motor during said interval causing actuation of the high pressure cylinder to reduce the pressure in the intermediary tank.

17. The combination with a motor, of compressor mechanism driven thereby for supplying a pressure system, a switch automatically controlled by the pressure in the system, a main relay controlled by said switch and adapted when a minimum pressure of the system is reached to be connected with a supply circuit to cause said motor to be initially connected with the supply circuit through a resistance, a master relay connected with the supply circuit upon minimum pressure in the system, a plurality of sub-relays controlled by the master relay and connected with said resistance, means upon energization of said master relay for causing gradual and successive connection of said sub-relays in circuit with the side mains whereby said resistance is gradually removed from the motor circuit, electromagnetically controlled unloading means for the compressor normally disposed to render the compressor ineffective, a circuit through said unloading mechanism controlling means closed upon actuation of the master relay for causing said unloading means to become ineffective after said motor has been connected directly with the main circuit, and an additional relay operative when maximum pressure in the system is reached to open the circuit through the unloading mechanism to cause the compressor to again become ineffective.

18. The combination with a motor, of a compressor driven thereby for supplying a pressure system, electromagnetically controlled unloading means for said compressor normally disposed to render the compressor ineffective, a switch controlled by the pressure in the system, a main relay connected with the main circuit by the switch when the pressure in the system becomes minimum, actuation of said main relay causing said motor to be initially connected with the supply circuit through a resistance, a slow acting master relay connected with the supply circuit upon minimum pressure in the system being reached, a plurality of sub-relays controlled by the master relay and each controlling a section of said resistance, actuation of said slow acting relay causing said sub-relays to be successively and gradually connected with the supply circuit to successively remove sections from said resistance to finally cause said motor to be directly connected with the supply mains, means associated with said slow acting master relay for causing closure of a circuit through the electromagnetic unloading mechanism after the motor has been directly connected with the supply circuit whereby the compressor becomes effective, an additional relay operated when maximum pressure of the system is reached to open the circuit through the unloading mechanism whereby the compressor is again rendered ineffective, means operating after an interval of time from the opening of the unloading mechanism circuit for breaking the circuit through said main relay whereby said motor is disconnected from the line circuit, and means operative after said interval for disconnecting the slow acting relay and the sub-relays from circuit.

19. The combination with a motor, of compression mechanism driven thereby for supplying a pressure system, a low pressure and a high pressure cylinder for said compression mechanism, electromagnetically controlled unloading means for the low pressure cylinder normally inert to render the cylinder ineffective, means for causing actuation of said unloading means to render the cylinder effective whereby pressure is supplied to the system thereby, an additional means for causing the unloading means to again become inert when maximum pressure in the system is reached to reduce the load of the high pressure cylinder on the motor, and means for then breaking the motor circuit.

20. The combination with a motor, of compression mechanism adapted to be driven thereby for supplying the pressure system, a low pressure and a high pressure cylinder for said compression mechanism, normally effective unloading means for the low pressure cylinder, means controlled by the pressure in the system for initially connecting said motor with a supply circuit through a resistance, automatic electromagnetic means for gradually removing said resistance from the motor circuit and for connecting said motor directly with the supply circuit, means for rendering said unloading mechanism ineffective after the motor has been directly connected with the supply circuit whereby the compression mechanism becomes effective to supply pressure to the system, means operative when the pressure in the system becomes maximum for rendering the unloading mechanism effective to cause the low pressure cylinder to become ineffective and its load removed from the motor thereby causing the load due to the high pressure cylinder to be reduced to a small value, and means for then disconnecting the motor from the supply circuit.

21. The combination with a motor, of compressors driven thereby for supplying a pressure system, a resistance for said motor, a switch controlled by the pressure in the system, a slow acting master relay connected with the supply circuit upon actuation of the switch, a plurality of sub-relays controlled by said master relay and each controlling a portion of said resistance, actuation of said master relay causing said sub-relays to be gradually and successively connected with the supply circuit whereby said resistance is gradually removed from the motor circuit and the motor connected directly therewith.

22. The combination with a motor, of a relay controlling the circuit through said motor, a resistance for said motor, electro magnetic switching mechanism associated with said resistance, and a slow acting master relay controlling the circuit through said switching mechanism, actuation of said relays causing said motor to be connected with the supply circuit and said resistance to be gradually removed from the motor-circuit.

23. The combination with a motor, of a relay controlling the circuit through said motor, a resistance for said motor, electro magnetic switching mechanisms associated with said resistance, and a slow acting master relay controlling the circuit through said first relay and through said electro magnetic switching mechanisms, actuation of said relays causing said motor to be first connected with the circuit through all the resistance and said resistance to be then gradually removed from the motor circuit.

24. The combination with a motor, of a coil, switch mechanism actuated by said coil to connect said motor in circuit, a resistance for said motor, electro magnetic switching mechanisms associated with said resistance, and a relay controlling said electromagnetic switch mechanism to gradually disconnect said resistance from the motor circuit after said circuit has been closed through said switch mechanism.

25. The combination with a relay, of automatic means for connecting said relay with a supply circuit, a motor having its circuit controlled by said relay, a slow acting relay also controlled by said automatic means, a resistance for the motor circuit controlled by the slow acting relay, and means operable upon actuation of said automatic means for connecting both said relays in circuit, whereby said motor is connected in circuit and said resistance gradually removed from the motor circuit.

26. The combination with a motor, of a relay, a coil controlled by said relay, switching mechanism controlled by said coil to connect said motor in circuit, a resistance for said motor circuit, a master electro magnetic switch controlled by said relay, a plurality of subelectro magnetic switches controlled by said master switch, and means operable upon actuation of said master switch for causing sections of said resistance to be successively removed from the motor circuit by said subelectro magnetic switches after the motor has been connected in circuit upon actuation of said coil.

27. The combination with a motor, of a compression system actuated thereby for supplying a pressure system, a main switch controlled by the pressure in the system, a main relay, an electro magnetic switch, the windings of said relay and said electro magnetic switch being serially connected in circuit and with a supply source upon actuation of said main switch, said electro magnetic switch controlling said motor circuit, a resistance in said motor circuit, and a plurality of subelectro magnetic mechanisms each controlling a section of said resistance, actuation of said main relay causing actuation of said subelectro magnetic mechanisms to gradually disconnect said resistance from the motor circuit.

28. The combination with a motor, of a compression system actuated thereby for supplying a pressure system, a main switch controlled by the pressure in the system, a main relay, an electro magnetic switch for controlling the motor circuit, the windings of said main relay and said electro magnetic switch being connected serially in circuit and with a supply source upon actuation of said main switch, a resistance normally all included in the motor circuit, a master relay controlled by said main relay, a plurality of subelectro magnetic switches controlled by said master relay and each associated with a section of said resistance, and means operable upon actuation of said master relay for causing successive actuation of said subelectro magnetic switches, whereby said resistance is gradually removed from the motor circuit and said motor connected directly with the supply source.

29. The combination with a motor, of compression mechanism driven thereby for supplying a pressure system, a main switch controlled by the pressure in said system, a main relay, an electromagnetic switch, the windings of said main relay and said electro magnetic switch being connected serially in circuit and adapted for connection with a supply source upon actuation of said main switch, said electro magnetic switch controlling the circuit through said motor, a normally effective resistance in said motor circuit, a master electro magnetic switch controlled by said main relay, a plurality of subelectro magnetic switches connected with said resistance, and means for causing slow actuation of said master electro magnetic switch upon energization thereof to successively connect said subelectro magnetic switches in circuit, whereby said resistance is gradually rendered ineffective and said motor connected directly with the supply source.

30. The combination with a motor, of a compression system driven thereby for supplying a pressure system, a main switch controlled by the pressure in the system, a main relay and an electro magnetic switch adapted for connection with a supply source upon actuation of said main switch, said electro magnetic switch controlling the motor circuit, a normally effective resistance in said motor circuit, a master slow-acting electro magnetic switch controlled by said main relay, a plurality of subelectro magnetic switches connected with said resistance, a plurality of circuit-closing switching means adapted to be successively actuated upon energization of said master electro magnetic switch to successively connect said subelectro magnetic switches in circuit, whereby said resistance is gradually rendered ineffective and said motor connected directly with the supply circuit.

31. The combination with a motor, of a compression system actuated thereby for supplying a pressure system, a main switch controlled by the pressure in the system, a circuit for said motor, a resistance normally all included in the motor circuit, a solenoid controlling only said motor circuit, a slow acting main relay controlled by said main switch, actuation of said main switch causing connection of said main relay and said solenoid with a supply source, a plurality of similar electro magnetic switches connected with said resistance but normally disconnected from circuit, and means operable upon energization of said main relay for causing said electro magnetic switches to be successively connected in circuit and actuated to gradually render said resistance ineffective and to directly connect said motor with the supply source.

32. The combination with a motor, of a compression system actuated thereby for supplying a pressure system, a main switch controlled by the pressure in the system, a main relay for controlling only the motor circuit, a resistance in said motor circuit, a slow acting main relay, actuation of said main switch upon minimum pressure in the system causing connection of said relays with a supply circuit, whereby said motor is connected with the supply circuit with all the resistance effective, a plurality of similar electro magnetic switches connected with said resistance and controlled by said main relay to be normally disconnected from circuit, connection of said main relay causing successive actuation of said electro magnetic switches in circuit and actuation thereof, whereby said resistance is gradually rendered ineffective and the motor directly connected with the supply source, and means upon maximum pressure in the system for causing de-energization of said main relay.

33. The combination with a motor, of a compression mechanism driven thereby for supplying a pressure system, a main switch controlled by the pressure in the system, a main relay controlling the motor circuit, a resistance in the motor circuit, an electromagnetic circuit closer controlled by said main switch and controlling said main relay, minimum pressure in the system causing actuation of said switch to connect said main relay and said circuit closer with a supply source, energization of said main relay normally causing said motor to be connected with the supply source with all the resistance effective, a master relay controlled by said main relay, a plurality of electro magnetic switches controlled by said master relay and connected with said resistance, means operable upon energization of said master relay for causing said electro magnetic switches to be successively energized to gradually render said resistance ineffective and to connect the motor directly with the supply source, and additional electro magnetic means adapted when maximum pressure in the system is reached to render said circuit closer inert, whereby said main relay is de-energized and said motor disconnected from the supply source.

34. The combination with a motor, of a compressor driven thereby for supplying a pressure system, electromagnetically controlled unloading means for said compressor normally disposed to render the compressor inoperative, a main switch controlled by the pressure in the system, a main relay controlling the circuit through said motor, a resistance in the motor circuit normally all effective, an electromagnetic circuit closer controlled by said switch and controlling the circuit through said main relay, actuation of said switch upon minimum pressure of the system being reached causing energization of said main relay and said circuit closer, said motor upon actuation of said main relay being connected with the supply source and all the resistance effective, a master relay controlled by the main relay, a plurality of sub-relays connected with said resistance and controlled by the master relay, means for causing slow actuation of said master relay whereby said sub-relays are successively connected in circuit to gradually render said resistance ineffective and to connect the motor directly with the supply circuit, means operable upon connection of the sub-relays for checking further actuation of said master relay, means operable upon such checking for closing a circuit through the electromagnetically controlled unloading mechanism whereby the compressor is rendered effective, additional relay mechanism adapted when maximum pressure in the system is reached to release said checking means to open the circuit through the electromagnetically controlled unloading mechanism whereby the compressor is rendered ineffective and its load removed from the motor, and means operable after an interval of further actuation of said master relay for causing de-energization of said circuit closer whereby said main relay is de-energized and said motor disconnected from circuit.

35. The combination with a motor, of a resistance therefor, means controlled by the pressure in the system for initially connecting said motor with a supply circuit with all the resistance effective, electromagnetic switching mechanism also controlled by the pressure in the system and associated with said resistance and adapted upon actuation to successively remove sections of said resistance from circuit, a load for said motor, and electromagnetic means for placing said load upon the motor only after said resistance has all been removed from circuit.

36. The combination with a motor, of a main relay controlling the circuit therethrough, a resistance in the motor circuit normally all effective, a master relay, a plurality of electro magnetic switches controlled by said master relay and connected with the resistance, means operable upon actuation of said master relay for causing said electro magnetic switches to be successively connected with the supply circuit, to gradually render said resistance ineffective a load for said motor, and means for placing said load upon the motor only after said resistance has all been rendered ineffective.

37. The combination with a motor, of a main relay controlling the circuit through said motor, a resistance in the motor circuit normally all effective, a master relay, a plurality of electro magnetic switches controlled by the master relay and each controlling a portion of said resistance, and means operable upon actuation of said master relay for causing said electro magnetic switches to be successively included in circuit whereby said resistance sections are successively rendered ineffective and the motor finally directly connected with the supply circuit.

38. The combination with a motor, of a main relay controlling the circuit through said motor, a resistance in the motor circuit normally all effective, a master relay, a plurality of electro magnetic switches controlled by the master relay and each controlling a portion of said resistance, means operable upon actuation of said master relay for causing said electro magnetic switches to be successively included in circuit whereby said resistance sections are successively rendered ineffective and the motor finally directly connected with the supply circuit, and means operable after actuation of said relay and electro magnetic mechanisms for automatically reducing the current flow therethrough.

39. The combination with a motor, of a compressor driven thereby for supplying a pressure system, a main switch controlled by the pressure in the system, a main relay controlling the circuit through the motor, a resistance in the motor circuit normally all effective, a circuit closer controlled by said main switch and controlling said first relay, a master relay controlled by said main switch, a plurality of electro magnetic switches controlled by said master relay and connected with said resistance, means operable upon actuation of said master relay for causing successive actuation of the electro magnetic switches, whereby the resistance is gradually rendered ineffective and the motor directly connected in circuit, and means operable after actuation of said relay mechanisms and said electro magnetic switches for automatically reducing the current flow therethrough.

40. The combination with a motor, of a compressor driven thereby for supplying a pressure system, normally effective unloading mechanism for said compressor, electro magnetic controlling means for said unloading mechanism, a main switch controlled by the pressure in the system, a main relay controlling circuit through said motor, a resistance in the motor circuit normally all effective, a circuit closer controlled by said main switch and controlling the circuit through said main relay, a master relay controlled by said main switch, a plurality of electro magnetic switches controlled by said master relay and connected with said resistance, means operable upon energization of said master relay for causing said electro magnetic switches to be successively connected in circuit whereby said resistance is gradually rendered ineffective and the motor directly connected in circuit, means operable after direct connection of said motor in circuit for causing actuation of the electro magnetic means controlling the unloading mechanism to render the compressor effective, means operable upon actuation of said electro magnetic controlling mechanism for automatically reducing the current flow through said relay mechanism and said electro magnetic switching mechanism, means controlled by the main switch for disconnecting the electro magnetic unloading controlling mechanism from circuit, whereby said compressor becomes ineffective, and means controlled by the master relay for subsequently rendering said circuit closer inert, whereby said main relay is de-energized to cause said motor to be disconnected from circuit.

In witness whereof, I hereunto subscribe my name this 28th day of December A. D. 1904.

WALTER J. RICHARDS.

Witnesses:
JOHN E. HUBEL,
W. L. MARCY.